Patented Dec. 1, 1931

1,834,895

UNITED STATES PATENT OFFICE

JACOB R. BROSSMAN, OF YEADON, PENNSYLVANIA, ASSIGNOR TO GENERAL ELECTRIC COMPANY, A CORPORATION OF NEW YORK

LAMINATED WOOD PRODUCT

No Drawing. Application filed April 24, 1931. Serial No. 532,708.

The present invention relates broadly to laminated wood products. More specifically it is concerned with a process for producing novel laminated products from sapwood by treating the same with condensation products of the phenolic type so that the laminated products which result will be strong, dense, extremely low in water absorption and of relatively high dielectric strength.

For a consideration of what I believe to be novel and my invention attention is directed to the following specification and the claims appended thereto.

Laminated wood products impregnated with phenolic condensation products and varnishes are known but products of this type known to me have been deficient practically, especially for electrical uses, in that they possessed relatively high water absorption characteristics. In accordance with my invention I am able to produce such products having extremely low water absorption properties. Furthermore the products produced in accordance with my invention are strong and dense, they machine easily and can readily be drilled or tapped thereby enabling them to be made into various parts for use as insulation in electrical apparatus. For example, they can be made into excellent operating rods for circuit breaker apparatus. Due to their low water absorption the products made in accordance with the process of my invention do not swell, warp or crack under humid conditions and are therefore suitable for the manufacture of articles which are exposed in use. In addition, due to the pleasing external appearance as well as the strength of objects fashioned from the products of my invention they find various uses in non-electrical fields, for example, in the manufacture of golf clubs, baseball bats, articles of furniture, etc.

After careful development an research I have found that the minimum moisture absorption is obtained in laminated products of the type with which this invention is concerned, by utilizing first, sapwood, that is that portion of the tree trunk containing the wood which is known as the sapwood. Second, I have found that certain steps must be followed in treating the wood with the phenolic condensation product; and third, that as a result of this treatment the impregnated product has a certain definite specific gravity which is critical and deviations from which produce greater water absorption characteristics in the finished product.

In order to illustrate, but not to limit my invention so that those skilled in the art to which it pertains may practice it the following detailed procedure is given:

Poplar veneer wood (as an example of suitable sapwood) laminations of any suitable thickness cut to the proper size are strapped into bundles with a metal screen spacer between each lamination. The bundles are put in a steam jacketed treating tank and given the following cycle of treatment:

The wood is dried for a period of 5 hours using a 26 inch vacuum. The wood is then cooled to room temperature while the vacuum is maintained. A phenol-formaldehyde varnish having a resin content of 35% and a specific gravity of 0.92 is run in and the wood is immersed therein for at least 12 hours, a pressure of 25 pounds per square inch being maintained. The varnish is now drawn off and steam turned in the jacket. The wood is allowed to drain till the excess varnish has dripped off. The tank is then closed and evacuated. The impregnated wood is now dried for a period of 20 to 24 hours at 100° C. employing a 24 to 26 inch vacuum. The wood removed from the tank after this treatment will be found to have a resin content of about 25 to 30%. The impregnated wood may be stored for future use in moisture proof paper.

When it is desired to mold the impregnated wood, enough layers of the treated wood are stacked to allow for a 25 to 30% compression in the mold. A light coating of powdered phenolic resin is sprinkled over the surface of each layer as it is placed in the mold.

The molding operation consists in bringing the mold to a temperature of 140° C. and curing the resin under pressure for a time equal to 1½ hours per inch of thickness of material. The pressure in the mold is maintained close to 1500 pounds per square inch although variations in pressure may be necessary depending on the specific gravity of the wood. The mold is cooled to room temperature before removal of the molded wood.

The molded product may be machined or fashioned to any desired shape. It has pleasing appearance, is dense and strong and has extremely low water absorption, less than 2.5%. In order to have this low water absorption characteristic the specific gravity of the molded product must be 1.28 to 1.30. Such specific gravity in the molded product is obtained by the process just outlined.

What I claim as new and desire to secure by Letters Patent of the United States, is:

1. A laminated sapwood product impregnated with a phenolic condensation product in the infusible, insoluble state, said laminated product having a specific gravity of 1.28 to 1.30 and moisture absorption of less than 2.5%.

2. An article of manufacture comprising a dense, homogeneous laminated structure made from a plurality of layers of poplar sapwood impregnated and cemented together with a phenolic condensation product, the specific gravity of said impregnated wood structure being 1.28 to 1.30.

3. The process of making a low moisture absorption laminated wood product which comprises predrying sapwood in vacuum, impregnating the dried wood under pressure with a phenolic varnish, removing the excess varnish, drying the impregnated wood, covering a plurality of laminations of the impregnated wood with a surface coating of powdered phenolic resin and molding the laminations into a homogeneous solid mass at a pressure of 1500 pounds per square inch and a temperature of 140° C. for 1½ hours per inch of thickness of material and cooling the mold to room temperature before removal of the molded product.

In witness whereof I have hereunto set my hand.

JACOB R. BROSSMAN.